Oct. 4, 1966  G. J. JAQUISS  3,276,143
SIMULATED RADIAC TRAINER
Filed July 22, 1964  10 Sheets-Sheet 1

INVENTORS
GERARD J. JAQUISS
BY
Laurence S. Epstein
ATTORNEYS

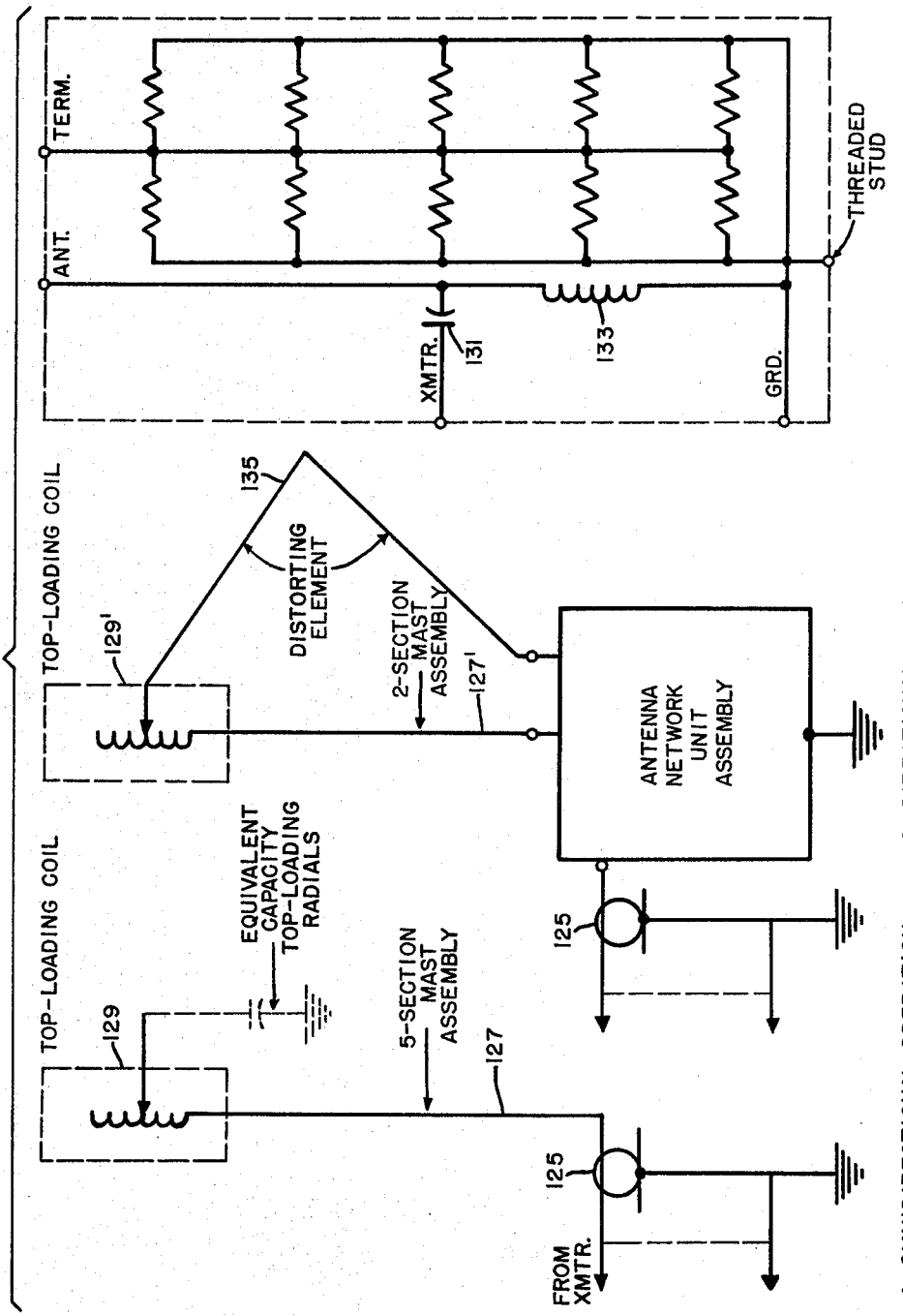

INVENTOR.
GERARD J. JAQUISS

United States Patent Office 3,276,143
Patented Oct. 4, 1966

3,276,143
SIMULATED RADIAC TRAINER
Gerard J. Jaquiss, Huntington, N.Y., assignor to the United States of America as represented by the Secretary of the Navy
Filed July 22, 1964, Ser. No. 384,561
4 Claims. (Cl. 35—1)

The invention described herein may be manufactured and used by or for the Government of the United States of America for governmental purposes without the payment of any royalities thereon or therefor.

This invention relates to radiation survey training, and more particularly to a method of training individuals in the survey of radiological hazards, and devices used in such training.

One of the objects of this invention is to provide a method whereby individuals may obtain training in radiological survey without necessitating the use of actual hazardous radioactive materials.

Another object of the invention is to provide a simple method whereby individuals may be trained in the survey of simulated radiological hazards.

A further object of the invention is to provide an improved simulated radiacmeter.

Figure 1:
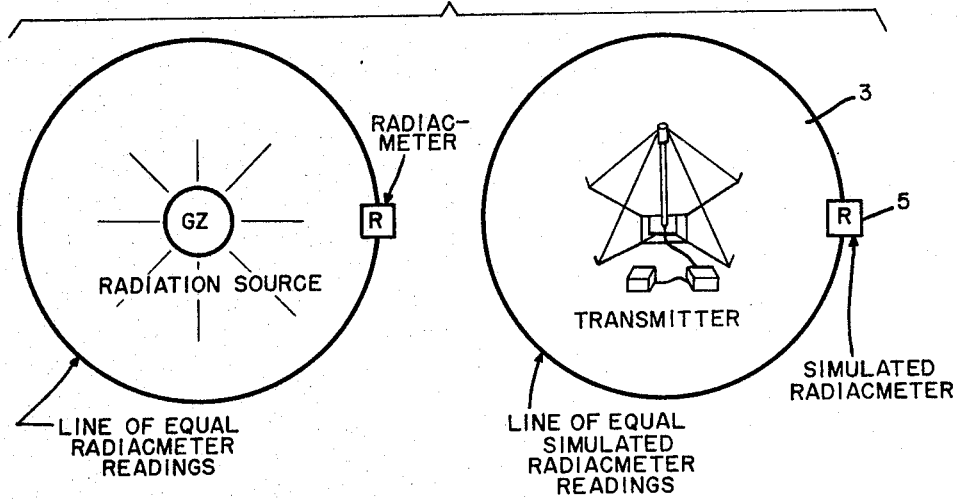

Other objects and many of the attendance advantages of this invention will be readily appreciated as the same becomes better understood by reference to the following detailed description when considered in connection with the accompanying drawings wherein:

FIG. 1 shows the radiation pattern resulting from an omni-directional atomic radiation source and an omni-directional radio wave source.

Figure 2:
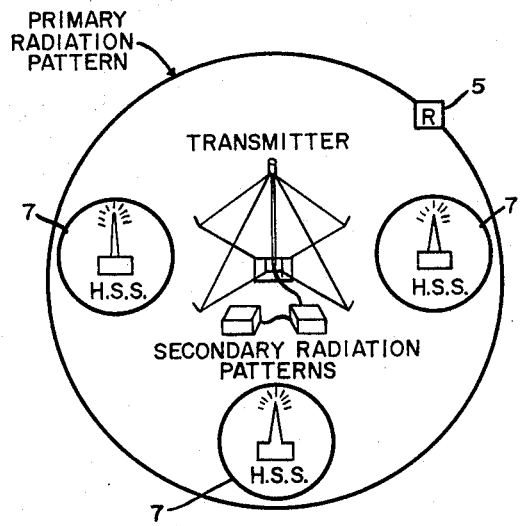
Figure 3:
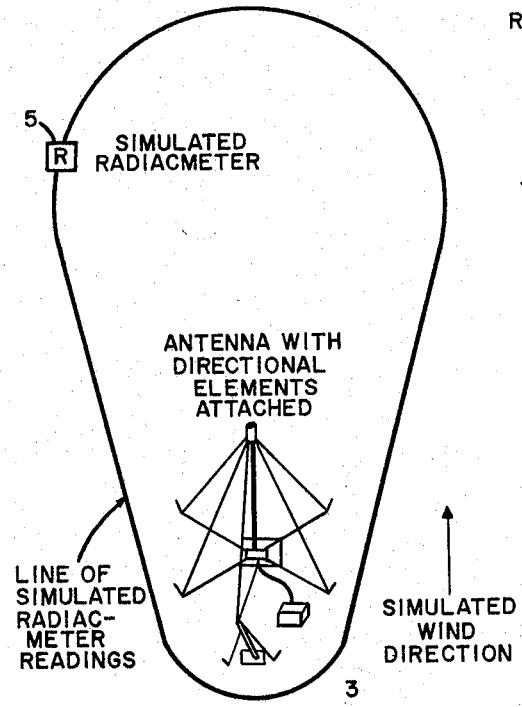
Figure 4:
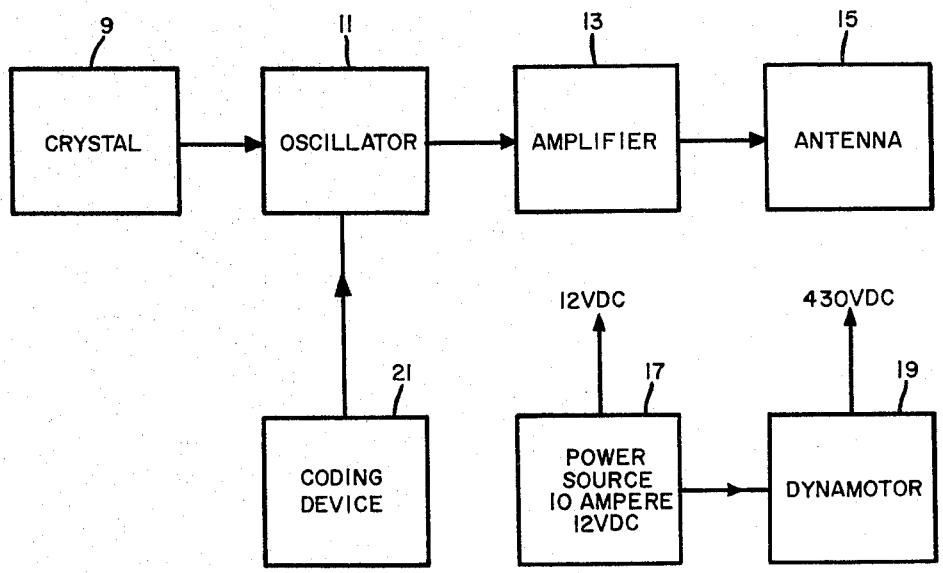
Figure 5:
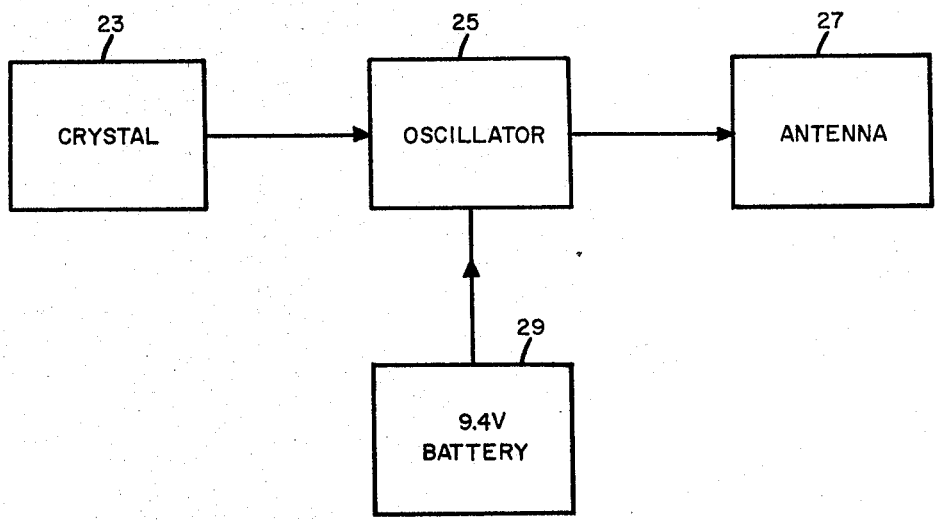
Figure 6:
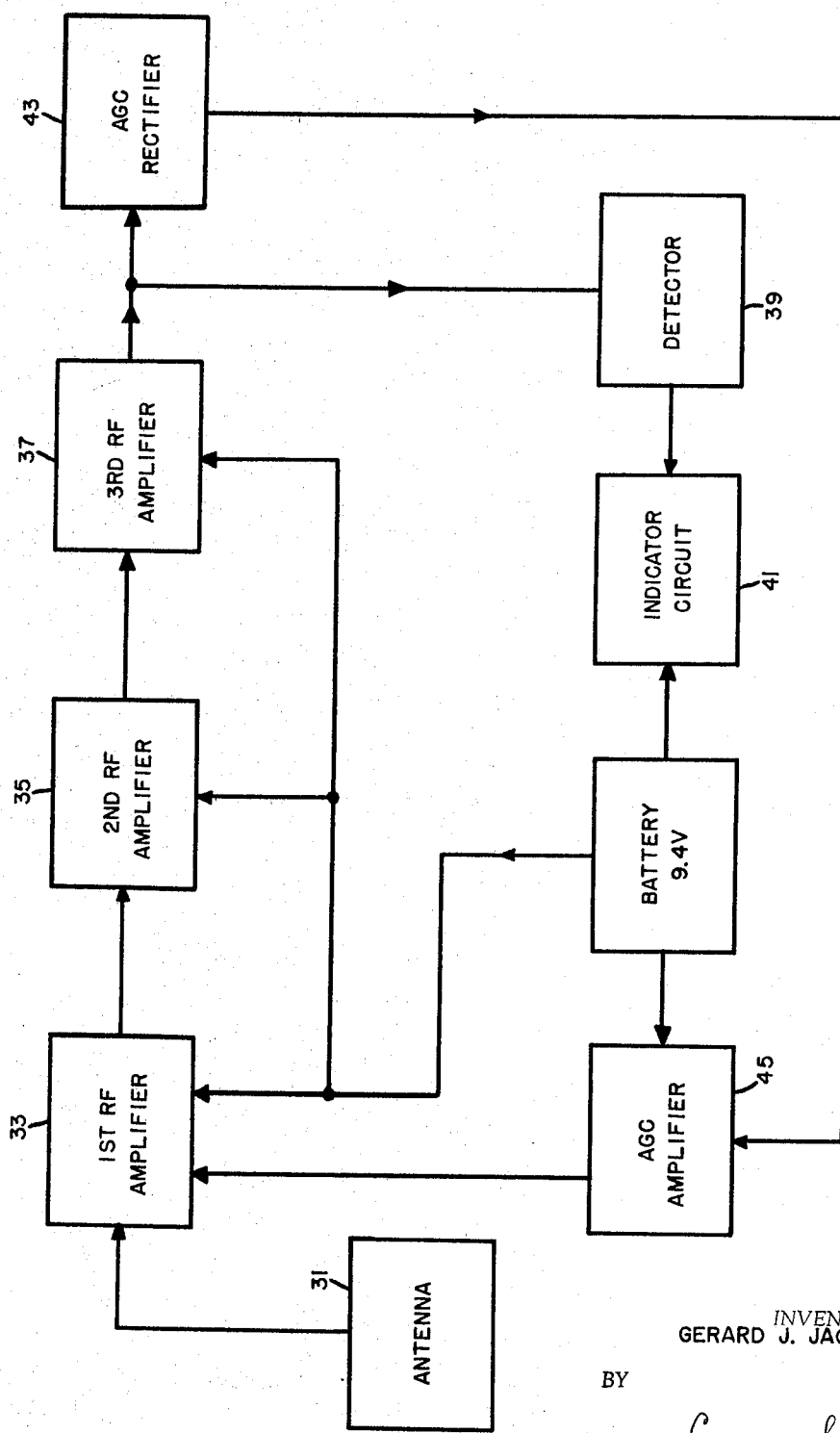
Figure 7A:
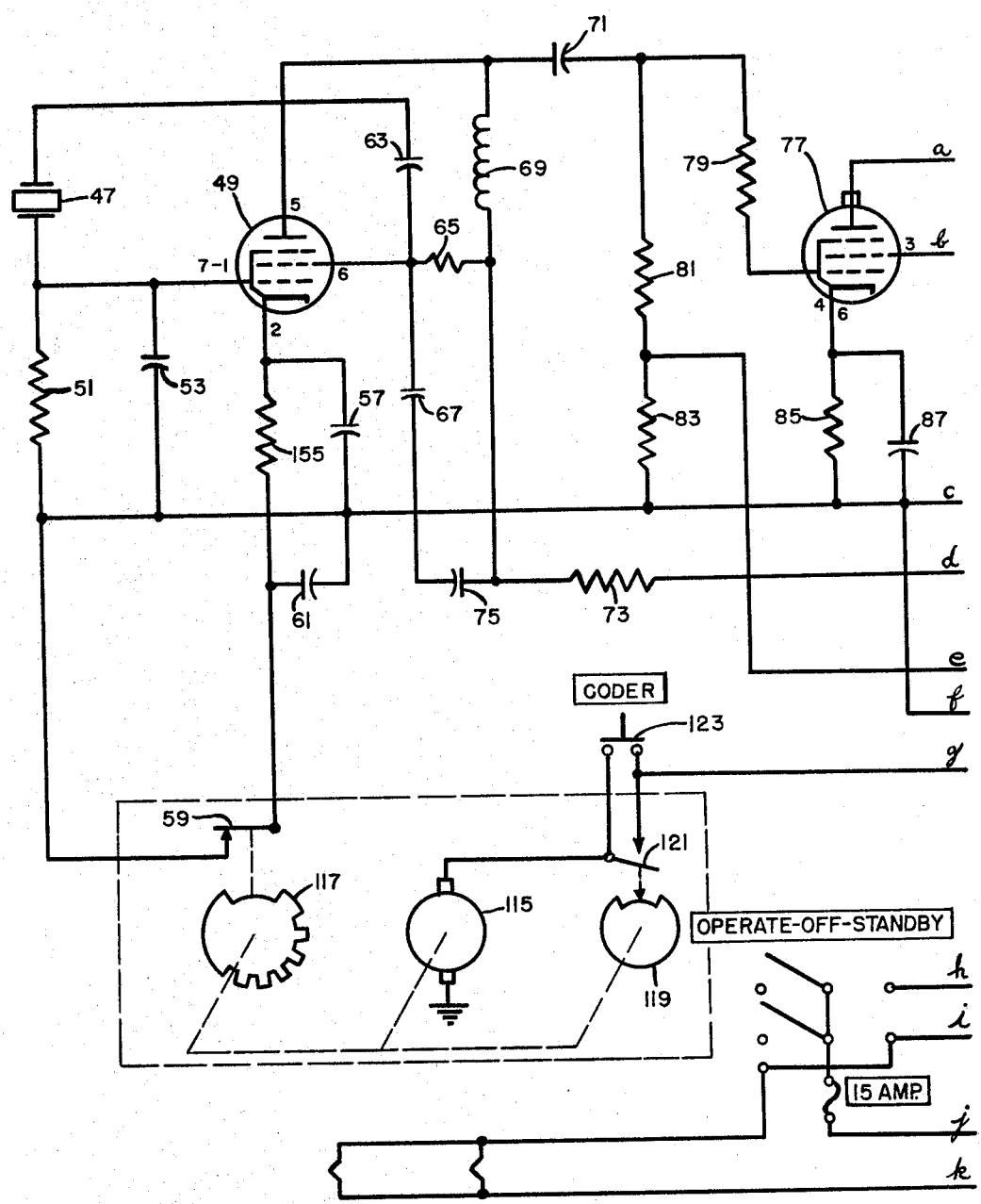
Figure 7B:
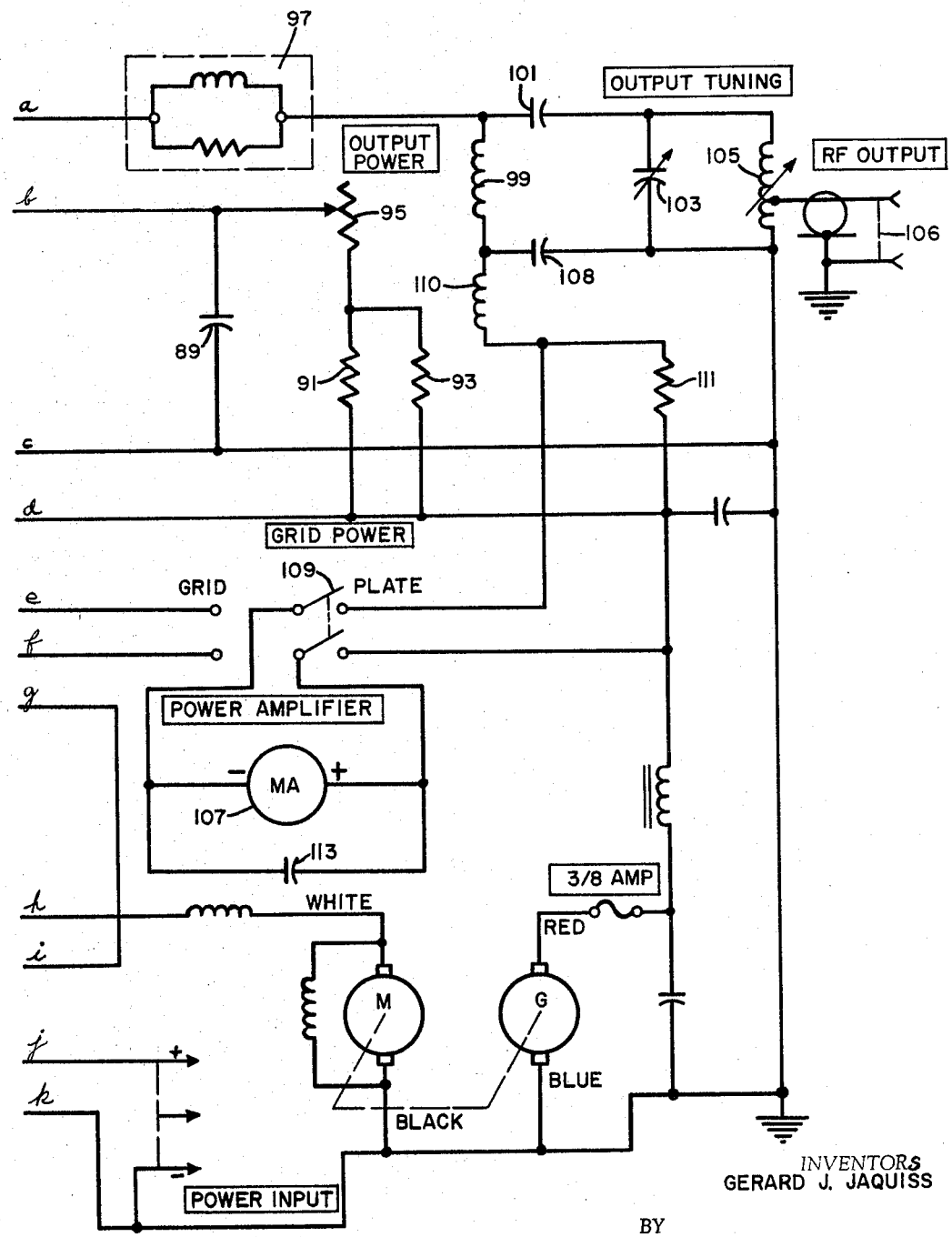
Figure 9:
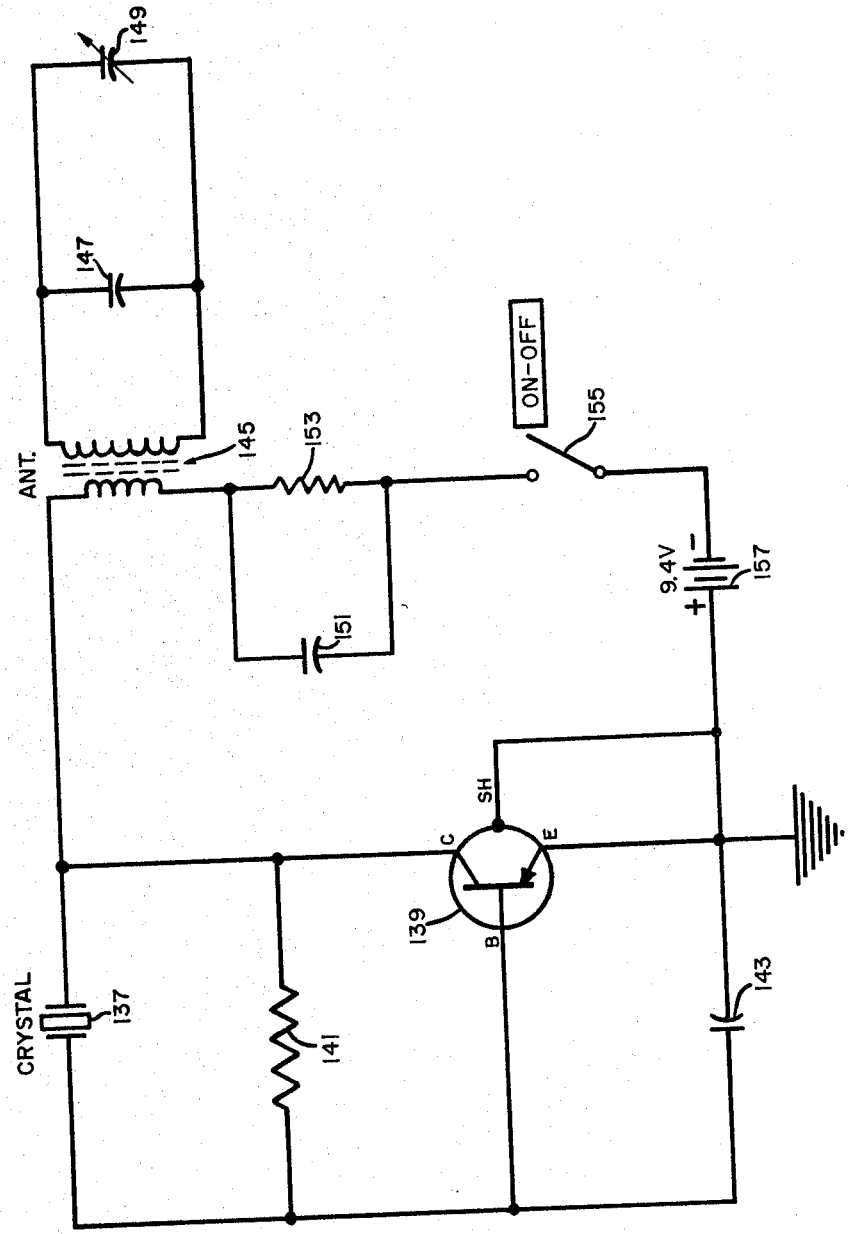
Figure 10A:
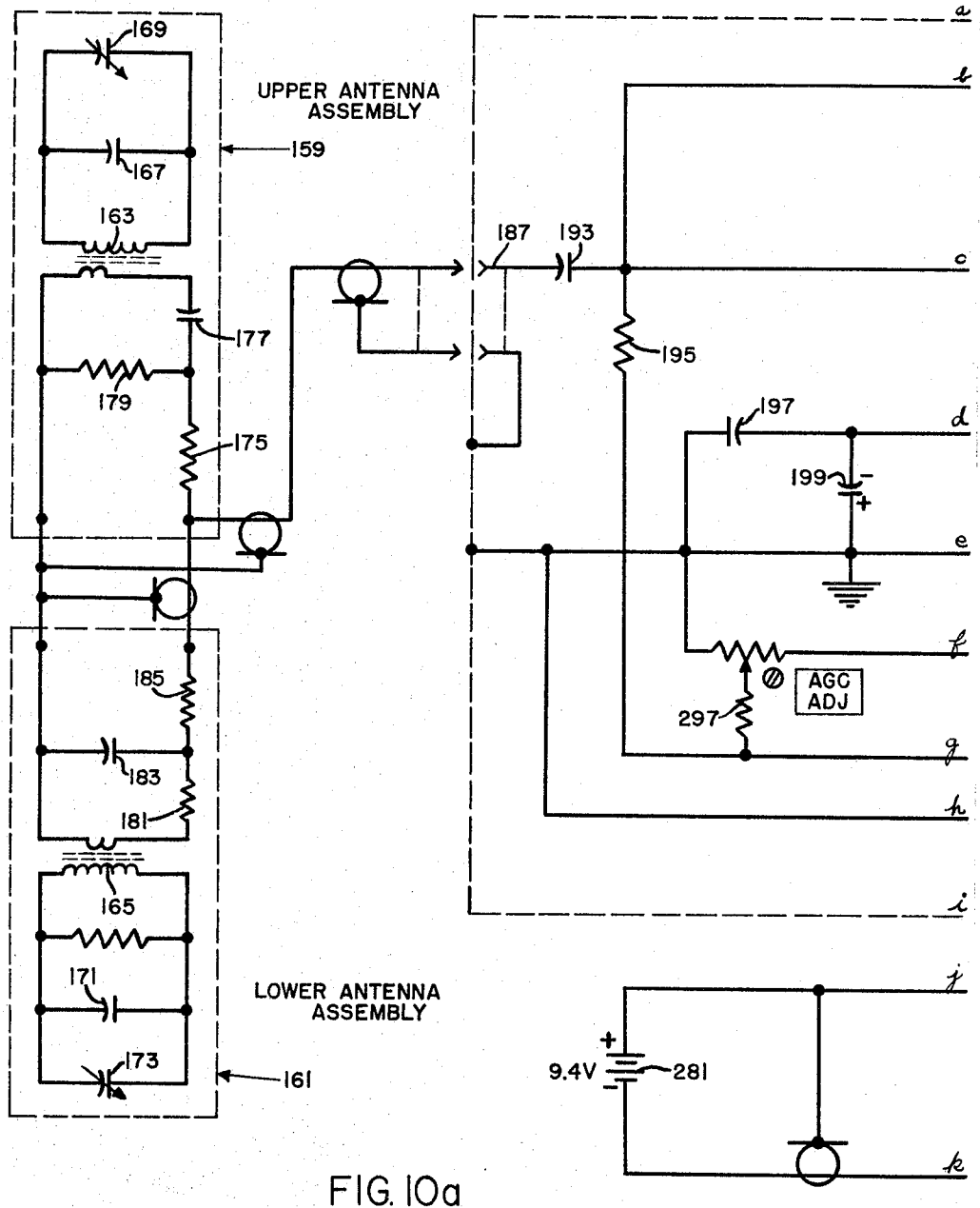
Figure 10B:
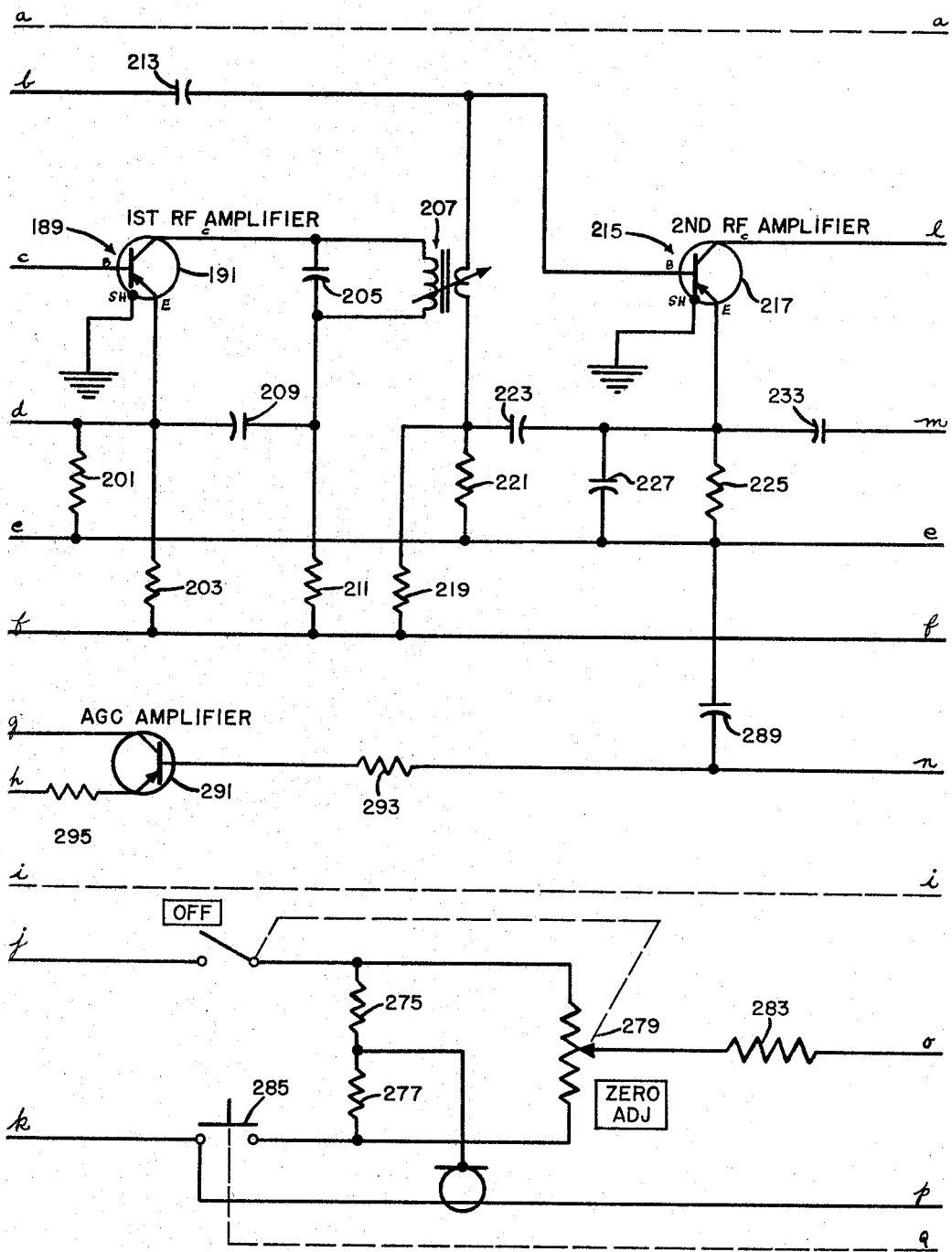
Figure 10C:
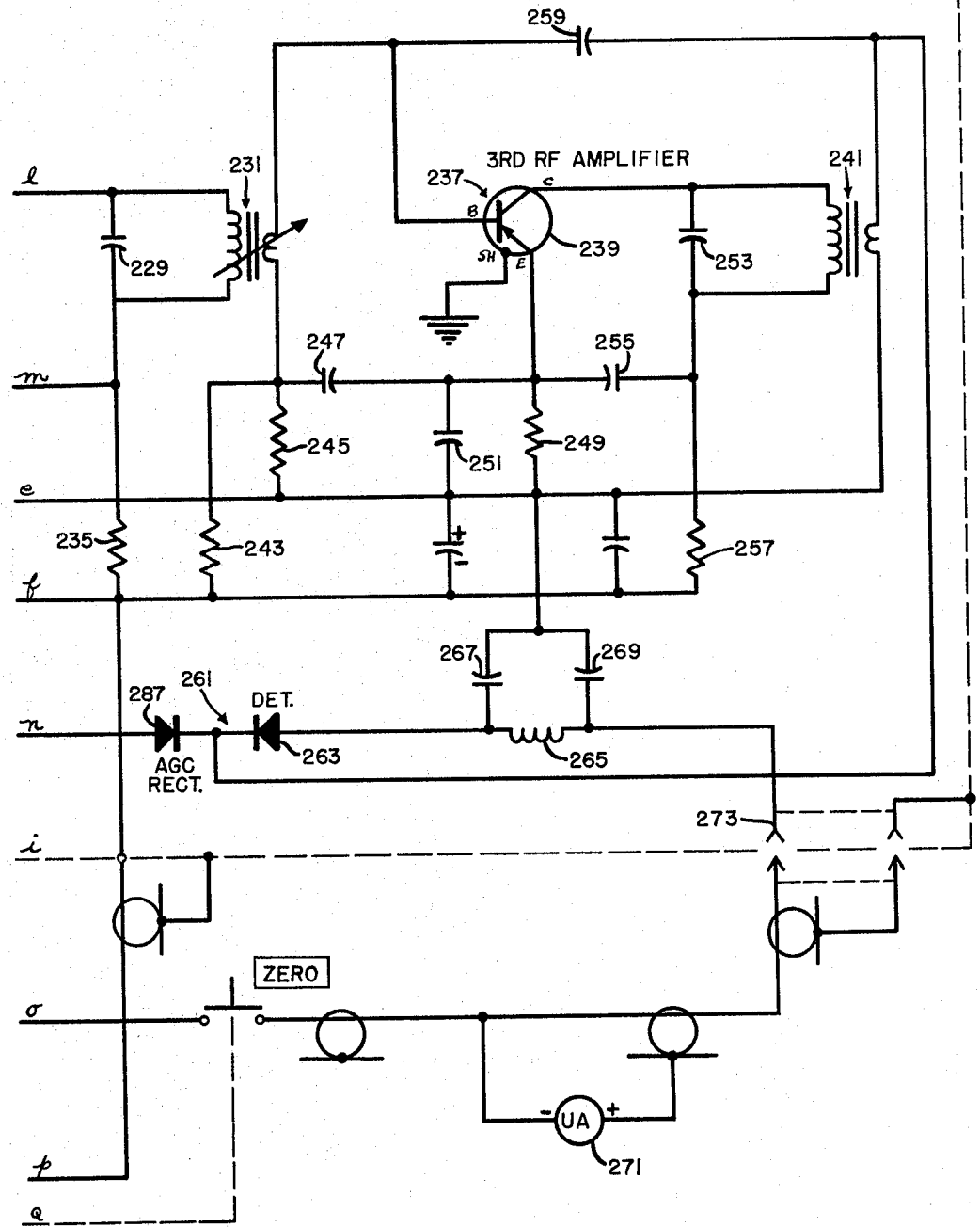

FIG. 2 illustrates the training aspects and radiation pattern of an omni-directional radio wave source with hot spot simulators, FIG. 3 illustrates the training aspects and distorted radiation pattern of a directional radio wave source, FIG. 4 is a functional block diagram of the transmitter used as a source of radio waves, FIG. 5 is a functional block diagram of the hot spot simulator, FIG. 6 is a functional block diagram of the simulated radiacmeter, FIG. 7a and FIG. 7b are schematics of the transmitter, FIG. 8 is a schematic of the transmitter antenna, FIG. 9 is a schematic of the hot spot simulator, and FIGS. 10a, 10b, and 10c are detailed schematics of the simulated radiacmeter.

The process of determining the extent and degree of radioactive contamination on areas is known as radiological survey, and is generally accomplished in the following manner. From information received through the normal communication facilities, a commander makes a rough estimate of the location at which atomic radiation hazards exist. An aerial survey may then be made by means of fixed or rotary wing aircraft, thereby providing immediate, but only approximate, information about the extent of the danger area. A ground survey may then supplement this preliminary aerial survey so that the danger perimeter may be exactly outlined.

Radiological defence is concerned primarily with preventing or minimizing radiation casaulties from atomic bursts, fallout, and from radioactive materials used as casualty producing agents. Casualties can result from both the instantaneous or "prompt" radiation which accompanies a nuclear explosion, and that emitted by radioactive materials. All militarily significant radiation from an air atomic burst is delivered within about the first minute and a half. Radioactive materials from surface and subsurface bursts, on the other hand, produce areas of intense, lingering radiation. Radiological warfare also involves the deliberate dissemination of radiological materials.

A measure of radiation field strength around ground-zero (or small area source) may reveal a radiation pattern. Since many common substances may themselves become radioactive, after exposure to a nuclear explosion, a radiation field may exist around the exposed area for a considerable time after the explosion. Radioactive dust, carried by the wind, may fall some distance from ground-zero of the explosion and, as a result, distort the radiation pattern. This is known as fallout. In addition, many local objects may become intensely active for a long period of time causing the appearance of very "hot" or active spots in an otherwise subsiding field. Hence, the need for determining the radiation field configuration and the location of the "hot" spots becomes apparent.

A radiacmeter is a device used to determine the presence, and measure the intensity of radiation. When a radiation detector, located in or connected to the radiacmeter proper, is exposed to radiation, current flow is initiated within a detector. Thus current may be applied, either directly or after amplification, to an indicator such as a neon bulb, a headphone, or a meter. The degree of radiation present is indicated respectively, by the rapidity of neon bulb flashing, the number of clicks per second in the headphone, or by pointer indication on the meter.

As illustrated at A, FIG. 1, the pattern of atomic radiation may be determined by using radiacmeters to determine points of radiation intensity around the source. As shown at B, FIG. 1, this same pattern may be harmlessly simulated by substituting a radio transmitter for the radiation source and by replacing the radiacmeters with radio receivers. This is the method employed by this invention to simulate the field effects of a nuclear explosion. A transmitter 3 radiates a radio wave at a predetermined frequency, in the 3155 to 3400 kilocycle band, in the preferred embodiment, effective at a distance of from zero to ten miles. A supply of radio receivers 5 (simulated radiacmeters) are available for use in plotting this radio propagation pattern.

Referring now particularly to FIG. 2, the hot spots that normally occur within an atomic radiation field may be simulated by placing any number of accompanying hot spot simulators 7 at the places desired. These are actually low-power transmitters operating at the transmitting sets frequency, and located within the radio-propagation field of the transmitter.

Referring now to FIG. 3, to simulate the effect of a distorted radiation pattern, the device has been provided with directional elements which may be attached to the normally non-directional antenna assembly to produce a directional radio-propagation pattern.

The invention has been designed to serve as an aid in developing and maintaining the proficiency of radiation survey personnel. It can be used for determining the extent and strength of simulated atomic radiation fields, location of hot spots, and for solving problems involving tactical gamma radiation during practical field exercises and maneuvers. The device is intended to bridge the gap which normally would exist between laboratory type exercises using low intensity radioactive sources and the survey problems that may be encountered in actual field maneuvers of exercises. The device is also intended to develop individual skill, to teach team cooperation and to impart information and knowledge pertinent to the solution of radiation survey problems.

A transmitter 3 is used to simulate the radiation fallout resulting from a nuclear reaction. This is accomplished in the preferred embodiment, by radiating a 3,155 to 3,400 kilocycle radio wave in an essentially omni-directional pattern, as illustrated in FIG. 1, B, to a distance of from zero to ten miles. The actual operating frequency is assigned by a local signal officer at each post, camp, or station.

The simulated radiacmeter 5 simulates its real counterpart in appearance and operation. The units supplied are employed to plot the radio-propagation pattern of the transmitter 3.

Referring to FIG. 4, the transmitter 3 includes a crystal 9, which controls the frequency of oscillator 11. Oscillator 11 output is amplified by amplifier 13, and fed to an antenna 15. A battery 17 or other source is required to supply the tube heaters, and energize dynamotor 19 which supplies high voltage D.C. for tube operation. The coding device 21 provides automatic keying of an identification signal whenever the CODER button, described infra, is pressed.

Referring to FIG. 5, the hot spot simulator includes a crystal 23 which controls the frequency of transistor oscillator 25. Oscillator 25 output is fed to antenna 27. Oscillator power is supplied by a self-contained battery 29.

Referring to FIG. 6, the transmitter's signal is picked up by omni-directional antenna 31 of the simulated radiacmeter, and amplified by R.F. amplifiers 33, 35 and 37. Amplified signal output is detected by detector 39 and applied to indicator circuit 41. The meter indication is in proportion to the received-signal strength. Amplified signal output from the 3rd R.F. amplifier 37 is also fed to an AGC rectifier 43. The output of 43 is amplified by AGC amplifier 45 and applied to the 1st R.F. amplifier 33 as a gain-control bias.

Referring to FIG. 7, the transmitter's crystal 47 controls the frequency of a modified Pierce oscillator 49. The grid circuit consists of grid-leak bias resistor 51 and drive-limiting capacitor 53. Protective bias is supplied by cathode resistor 55 and bypass capacitor 57. The ground return for resistor 55 is through the normally-closed contacts of keyer switch 59. Capacitor 61 is connected across switch 59 to obtain the required keying wave shape. Blocking capacitor 63 permits oscillator feedback through crystal 47 without crystal stress due to D.C. operating voltages. The screen circuit consists of dripping resistor 65 and drive-limiting capacitor 67. The screen functions as a virtual plate of the basic Pierce oscillator while the actual plate provides electron-coupled output. Plate load choke 69 and coupling capacitor 71 provides output coupling to the amplifier grid circuit. Voltage-dropping resistor 73 and bypass capacitor 75 also provide additional plate supply filtering.

Amplifier 77 provides the required transmitter output power. The grid circuit consists of parasitic-suppression resistor 79, grid leak bias resistor 81 and meter shunt resistor 83. Protective bias is supplied by cathode resistor 85 and bypass capacitor 87. The screen circuit consists of bypass capacitor 89, screen-dropping resistors 91 and 93 and output power rheostat 95. Rheostat 95 permits output power adjustment by effectively changing the value of the screen-dropping resistor and resultant screen voltage. Suppressor 97 prevents high-frequency parasitic oscillation in amplifier 77. Shunt-feed choke 99 and coupling capacitor 101 couple the plate of amplifier 77 to a tuned circuit consisting of output tuning capacitor 103 and inductor 105.

The output tuning capacitor 103 permits adjustment for resonance at the desired operating (crystal) frequency. The tap on inductor 105 provides a 50 ohm impedance at R.F. output connector 106 to match the characteristic impedance of the output cable. The plate decoupling filter consists of bypass capacitor 108 and choke 110. Resistor 111 is a meter shunt.

Meter 107 and switch 109 permit reading the grid or plate current of amplifier 77. The GRID position of switch 109 connects meter 107 across shunt resistor 83 and provides a grid current reading. The PLATE position of switch 109 connects meter 107 across shunt resistor 111 and provides a plate current reading. Capacitor 13 is an R.F. bypass for meter 107.

The torque required to operate the coding device is furnished by motor 115 through a flexible coupling and speed-reducing gear train. Rotation of identification disk 117 operates keying switch 59 and transmits an identification signal. The normal three-turn cycle of operation repeats the identification signal three times. Three turns of the identification disk 117, through a pinion-gear, spur-gear reducing mechanism, results in the driving of cam 119 through one revolution. Cam switch 121 is held closed during the coding device operating cycle by cam 119. Motor 115 received 12 v. D.C. power through cam switch 121 until the operating cycle is completed. CODER switch 123 must be depressed to bridge the normally-open contacts of cam switch 121 to start the coding device cycle of operation.

Referring to FIG. 8, A, the omni-directional antenna radiation pattern simulates a nuclear-radiation survey pattern that might be obtained in the absence of modifying influences. Transmitter output cable 125 is a coaxial transmission line for the antenna system. The antenna system ground consists of eight radials and eight grounding stakes. Five-section mast assembly 127 serves as the vertical radiator. Since the mast is not a ¼-wave long, top-loading is required for resonance. Inductive loading is provided by top-loading coil 129. Rotation of the mast assembly changes the setting of coil 129 and provides a convenient means of antenna tuning. Capacitive loading is provided by four top-loading radials which also function as section of the four mast-support guys.

Referring to FIG. 8, B, the directional antenna radiation pattern simulates a nuclear-radiation survey pattern that might be obtained in the presence of wind, or other modifying influences. Transmitter output cable 125 is a coaxial transmission line for the antenna system. Capacitor 131 and inductor 133 are the elements of an impedance-matching network between the transmission line impedance and the load impedance presented by the directional antenna system. The antenna system ground consists of eight radials and eight grounding stakes. Mast assembly 127' is extended to a two-section length for use as the vertical radiator. Inductive loading is provided by top-loading coil 129'. The distorting element 135 extends out from coil 129' and "folds" back to a termination resistance of approximately 233 ohms. The distorting element reduces radiation in the direction in which it extends from the mast and loading coil.

Referring to FIG. 9, the hot spot simulator circuit includes a crystal 137 which controls the frequency of modified Pierce oscillator 139. The base circuit consists of bias resistor 141 and drive-limiting capacitor 143. Capacitor 143 is necessary to obtain the desired stability and self-starting characteristics. Coil 145 is a ferrite antenna device which functions as the collector load and the radiating element. Separate collector-circuit and tuned-circuit windings are required to obtain the proper collector load impedance for oscillator 139. Coil 145 is tuned by fixed capacitor 147 and trimmer-adjustment capacitor 149. Resistor 141 prevents transistor burn-out in the event that crystal 137 is removed during oscillator operation. Bypass capacitor 151 prevents signal dissipation in resistor 153. Switch 155 turns the power from battery 157 ON or OFF. A 9.4 v. mercury-cell type battery may be used to obtain the required battery life and operational stability. A bottom-shield is provided in the case to prevent detuning effects which would otherwise result from placing the unit on a conducting surface. However, close proximity to a large mass of ferrous material will still effect the tuning of coil 145.

Referring to FIG. 10, omni-directional antenna operation is provided by upper antenna assembly 159 and lower antenna assembly 161 of the simulated radiacmeter.

Ferrite antenna devices 163 and 165 are horizontally positioned and at right-angles to each other. Normal equipment operation cannot result in zero-signal pick-up for both ferrite antenna devices. Fixed capacitor 167 and trimmer capacitor 169 permit tuning adjustment of upper antenna assembly 159. Fixed capacitor 171 and trimmer capacitor 173 permit tuning adjustment of lower antenna assembly 161. Meter case proximity loads upper antenna assembly 159 and limits its operating Q. Resistor 175 loads lower antenna assembly 161 and limits its operating Q to a value approximately equal to that of upper antenna assembly 159. Equal Q is required to maintain an omni-directional pattern. Capacitor 177 and resistor 179 advance the output signal phase by 45 degrees. Resistor 181 and capacitor 183 retard the output signal phase by 45 degrees. Since the signal outputs from antenna assemblies 159 and 161 are 90 degrees out of phase, these signal outputs can be combined without the possibility of cancellation. Resistors 175 and 185 prevent inter-action between circuits of the two separate antenna assemblies. The combined output is fed to input connector 187.

A common-emitter circuit with AGC bias is used for first R.F. amplifier 189 input signal is applied to the base of transistor 191 through coupling capacitor 193. Base-bias current is supplied through resistor 195. Capacitor 197 is the emitter R.F. bypass. Capacitor 199 is the emitter low-frequency bypass. Resistor 201 provides emitter stabilization. Bleeder resistor 203 provides the additional stabilization, which is desirable when AGC bias is employed. Capacitor 205 and the primary of R.F. transformer 207 are the resonant load for the collector of transistor 191. Capacitor 209 and resistor 211 are a supply decoupling network. The transistor shell and internal shield are grounded to reduce feedback. Capacitor 213 provides neutralization.

A common-emitter circuit is used for the second R.F. amplifier 215. Input signal is applied to the base of transistor 217 by the low-impedance secondary of R.F. transformer 207. Stabilized base-bias current is supplied by bias resistor 219, bleeder resistor 221, and bypass capacitor 223. Emitter stabilization is provided by resistor 225 and bypass capacitor 227. Capacitor 229 and the primary of R.F. transformer 231 are the resonant load for the collector of transistor 217. Capacitor 233 and resistor 235 are a supply decoupling network. The transistor shell and internal shield are grounded to reduce feedback.

A common-emitter circuit is used for third R.F. amplifier 237. Input signal is applied to the base of transistor 239 by the low-impedance secondary of R.F. transformer 241. Stabilized base-bias current is supplied by bias resistor 243, bleeder resistor 245, and bypass capacitor 247. Emitter stabilization is provided by resistor 249 and bypass capacitor 251. Capacitor 253 and the primary of R.F. transformer 241 are the resonant load for the collector of transistor 239. Capacitor 255 and the resistor 257 are a supply decoupling network. The transistor shell and internal shield are grounded to reduce feedback. Capacitor 259 provides neutralization.

A conventional circuit is used for detector 261. Input signal is supplied to diode 263 by the low-impedance secondary of R.F. transformer 241. The detector output filter consists of choke 265 and capacitors 267 and 269. Rectified D.C. signal output is applied to meter 271. The meter ground return is through the cable and connector 273.

Resistor 275, resistor 277 and potentiometer 279 form an adjustable bridge circuit to simulate zero adjustment of an actual radiacmeter. Battery 281 provides power for the bridge circuit. Resistor 283 limits meter current during bridge unbalance. ZERO switch 285 is used to connect battery power to the bridge and connect the bridge to the meter during zero adjustment. Since the bridge is disconnected from the battery and meter circuits during normal use, it has no operational circuit function. Its only use is for training purposes in simulating actual radiacmeter operation.

A diode 287 is used in the AGC rectifier circuit. Input signal is supplied by the low-impedance secondary of R.F. transformer 241. Capacitor 289 is the output filter. The base circuit of AGC amplifier 291 is the AGC rectifier load.

The D.C. output from AGC rectifier 287 is fed to the base of AGC amplifier 291 through current-limiting resistor 293. Emitter stabilization is provided by resistor 295. No emitter bypass capacitor is required for D.C. amplifier operation. Resistor 297 is the collector load for AGC amplifier 291. Bias resistor 195 is connected directly to the collector for AGC amplifier 291. Resistor 297 and the effective resistance of AGC amplifier 291 act as a divider to determine the base-bias current for first R.F. amplifier 189. An increase in signal strength results in a decrease in base-bias current and a resultant decrease in R.F. amplifier gain. AGC ADJ potentiometer 297 sets the base-bias current and permits gain calibration.

Obviously many modifications and variations of the present invention are possible in the light of the above teachings. It is therefore to be understood that within the scope of the appended claims the invention may be practiced otherwise than as specifically described.

What is claimed is:

1. The method of training individuals in the surveying of radiological hazards comprising:
   simulating the resulting radiation field of a nuclear explosion by;
   transmitting an omni-directional propagation field,
   transmitting from an additional transmitter a signal whose field is contained within and is locally more intense than said surrounding (omni-directional) field, and is the same frequency of said field,
   distorting said omni-directional propagation field thereby providing a propagation field pattern which is distorted; and
   determining the pattern of the resulting simulated nuclear radiation field by detecting and measuring the intensity of the radiation field at a plurality of points.

2. The method of training individuals in the surveying of radiological hazards comprising:
   simulating the resulting radiation field of a nuclear explosion by;
   transmitting an omni-directional propagation field,
   transmitting from at least one additional transmitter at least one signal whose field is contained within and is locally more intense than said surrounding (omni-directional) field, and is the same frequency of said field,
   distorting said omni-directional propagation field thereby providing a propagation field pattern which is distorted, and
   determining the pattern of the resulting simulated nuclear radiation field.

3. The method of training individuals in the surveying of radiological hazards comprising:
   simulating the resulting radiation field of a nuclear explosion by;
   transmitting an omni-directional propagation field, and
   transmitting from an additional transmitter a signal whose field is contained within and is locally more intense than said surrounding (omni-directional) field, and is the same frequency of said field, and
   determining the pattern of the resulting simulated nuclear radiation field.

4. The method of training individuals in the surveying radiological hazards comprising:
   simulating the resulting radiation field of a nuclear explosion by;
   transmitting an omni-directional propagation field, transmitting from at least one additional transmitter at least one signal whose field is contained within and is locally more intense than said surrounding (omni-directional) field, and is the same frequency of said field, distorting said omni-directional propagation field thereby providing a propagation field pattern which is distorted, and determining the pattern (configuration) of the resulting simulated nuclear radiation field, by detecting and measuring the intensity of the radiation field at a plurality of points.

References Cited by the Examiner

UNITED STATES PATENTS 2,837,636   6/1958   Richard _____ 325—67

OTHER REFERENCES

Henney: Radio Engineering Handbook (McGraw-Hill, N.Y.), 1959, see pages 21–87 and 20–75 (two pages total).

EUGENE R. CAPOZIO, *Primary Examiner.*

R. E. KLEIN, *Assistant Examiner.*